Patented Aug. 15, 1950

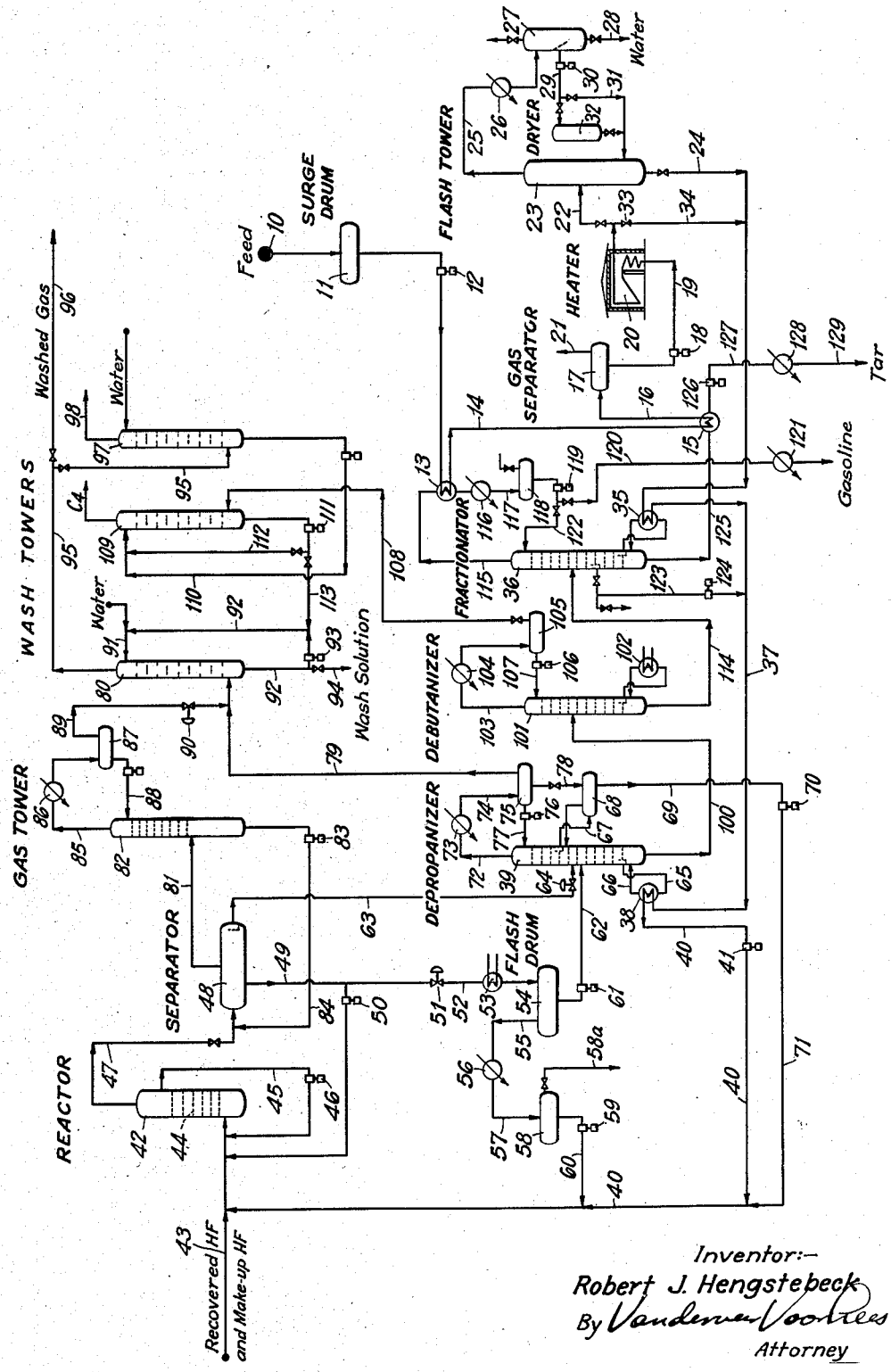

2,518,546

UNITED STATES PATENT OFFICE 2,518,546

CRACKING WITH HYDROGEN FLUORIDE CATALYST

Robert J. Hengstebeck, Chicago, Ill., assignor to Standard Oil Company, Chicago, Ill., a corporation of Indiana Application November 9, 1946, Serial No. 708,999

1 Claim. (Cl. 196—52)

This invention relates to a process of converting hydrocarbon oils and more particularly to a process and apparatus for converting heavy oils into gasoline, light hydrocarbon distillates and tar by the action of hydrofluoric acid catalyst.

One object of the invention is to effect the conversion of hydrocarbons by the action of HF in an economical and satisfactory manner. Another object of the invention is to recycle HF sludge thru the conversion zone while simultaneously withdrawing a regulated portion of the HF sludge and recovering HF therefrom for further use in the conversion reaction. Still another object of the invention is to recover HF from the gasoline products in a simple, economic and effective manner as will be more fully described hereinafter. The invention is illustrated by a drawing which shows diagrammatically an apparatus for suitably carrying out the process.

One of the difficulties in effecting conversion of hydrocarbons by the action of HF lies in recovery of the HF from the various stocks produced in the process. Because of the relatively high vapor pressure of HF it is found distributed in all stocks produced in the process extending all the way from the heavy tar to the fixed gases. It is furthermore highly impracticable to recover it by water absorption inasmuch as the aqueous solutions of HF are very corrosive and therefore difficult to handle and because the recovery of anhydrous HF from aqueous solutions is a costly operation. By the use of my process the HF catalyst is substantially all returned to the conversion reaction without the necessity of recovering it from aqueous solutions.

Referring to the drawing, the hydrocarbon stock to be treated is introduced at 10 and passes thru surge drum 11 and pump 12 to heat exchanger 13 where it is partly heated, as will be hereinafter described. The stock then flows by line 14 to heat exchanger 15 and thence by line 16 to gas separator 17, from which it flows by charge pump 18 and line 19 to heater 20. The stock employed is usually a heavy paraffinic distillate oil such as gas oil, kerosene, etc., or heavy distillates from carbon monoxide synthesis. Other stocks, however, may be treated such as paraffin wax, reduced crude, and, less desirably, heavy distillates from cracking processes, particularly gas oil from catalytic cracking employing siliceous catalysts. Gas oils from Mid-Continent and West Texas crude oil are particularly suitable stocks for treating by my process, as are also the more paraffinic heavy distillates from Pennsylvania, Michigan and Illinois crude oils.

Heater 20 may suitably be a pipe still and I prefer to heat the charging stock therein to a temperature of about 700 to 750° F. In the operation of my process, it is desirable to eliminate water from the hydrocarbon stock as far as economically possible and this may be accomplished in several ways. Thus in gas separator 17 water vapor and gas are discharged by line 21. If the amount of water left in the oil is still excessive, the charging oil stream may be passed by valved line 22 to flash tower 23 where the hot oil flows downwardly passing out by valved line 24 at the bottom. Sufficient pressure is maintained in tower 23 to prevent vaporization of all but a small portion of the oil, and the vapors produced are conducted by line 25 to condenser 26 and receiver 27. Here the condensate is collected and water is permitted to separate at the bottom from which it is removed by valved line 28 while the oil collecting in 27 flows by line 29 in pump 30 and line 31 back to tower 23. A small amount of water carried back to the tower in solution and/or entrained in the returned stream thru valved line 31 can be removed by alternatively passing the oil from pump 30 thru drying chamber 32, so that substantially every trace of water is removed before returning to tower 23. If the hydrocarbon stock is sufficiently dehydrated before charging to heater 20, it may be conducted directly by valve 33 and valved line 34 to heat exchanger 35 where the heated feed stock serves to provide heat for the operation of fractionating column 36 as hereinafter described. In heat exchanger 35 the temperature of the oil may be dropped from a point within the range of about 700 to 750° F. to a point within the range of about 500 to 600° F. The feed stock then flows by line 37 to heat exchanger 38 where heat is supplied for the operation of depropanizing tower 39 as hereinafter described. The feed stock now at a temperature of about 400 to 500° F. flows by line 40 and charge pump 41 to reactor 42. The temperature in reactor 42 may be about 200 to 400° F., preferably about 300° F., the temperature being obtained primarily by controlling the temperature of the hot oil feed.

Hydrofluoric acid catalyst is introduced by line 43 directly into the feed oil stream in line 40 or it may be injected directly into reactor 42 if desired. In reactor 42, intimate contact is obtained between the HF which is present largely in the liquid phase and the hydrocarbon oil. The weight ratio of HF to hydrocarbon oil in the reactor is preferably in the range of 1:1 up to about 4:1, altho somewhat lower ratios may be employed, particularly when operating at higher temperatures, in which case a ratio as low as about 0.2:1 may be employed. At the lower ratios of catalyst to oil the rate of conversion has been found to be too low to be practical in most cases and the preferred HF:oil ratio is about 2:1.

Contact between catalyst and oil phases in reactor 42 can be facilitated by the use of baffles 44 and by recycling the reaction mixture by line 45 and pump 46. Mechanical agitators can be employed also. The time of contacting, i. e. the average residence time of the oil, in reactor 42 is suitably about 1 to 60 minutes, depending on the catalyst-oil ratio, the temperature and character of the stock treated. The pressure employed is preferably sufficient to keep the HF in liquid phase, a pressure of about 500 to 5000 p. s. i. defining a suitable range. When operating at 300° F. to 350° F., a pressure of about 850 p. s. i. is satisfactory.

From reactor 42 the reaction mixture flows by line 47 to receiver 48 usually maintained under full reactor pressure and substantially at reactor temperature or somewhat below but without agitation. By reducing the pressure in line 47 by a moderate amount, e. g. from 700 p. s. i. to 500 p. s. i., a portion of the lighter products and HF is flashed in 48 with corresponding reduction in temperature, e. g. from 300° to 200–250° F. In the receiver 48 the reaction mixture separates into two layers, the upper layer consisting substantially of hydrocarbons with dissolved HF and the lower layer comprising an HF-hydrocarbon sludge. The lower layer or catalyst phase is continuously withdrawn by line 49 leading to pump 50 whereby it is recycled back to the reactor. Inasmuch as the catalyst phase or lower layer in separator 48 contains most of the tar produced in the process, it is necessary to withdraw a portion of it continuously or periodically to remove tar from the system. This is effected by conducting the catalyst phase thru pressure-reducing valve 51 in line 52 and heater 53 and thence to flash drum 54 where the pressure is maintained near atmospheric, e. g. 20 p. s. i. The vapors liberated, comprised mostly of HF and light hydrocarbons, are conducted by line 55 to condenser 56 whence the HF flows by line 57 to receiver 58 from which the liquid HF is withdrawn by pump 59 and forced by line 60 into the hot feed oil in line 40. Light hydrocarbons separating in 58 may be withdrawn by line 58a and, if desired, charged to depropanizer 39 for stabilization.

The tar collected in separator 54, the temperature of which is sufficiently high to maintain it in fluid condition, e. g. 150° F., is withdrawn by pump 61 and charged by line 62 into depropanizer 39. Simultaneously, the oil phase separated as an upper layer in receiver 48 is conducted by line 63 thru reducing valve 64 into depropanizer 39. Here the stocks are fractionated by heat supplied from 38 thru trapout recycle lines 65 and 66, the HF is condensed in the top of the fractionator and is trapped out with some butanes by line 67 leading to HF trapout drum 68, whence the liquid HF and butanes associated therewith are conducted by line 69 and pump 70 back to reactor 42, usually by injecting the stream directly into the hot oil feed stream by line 71.

The vapors from the top of depropanizer tower 39 are passed by vapor line 72 to condenser 73 and thence by line 74 to receiver 75 wherein the liquid propane fraction separates as an upper layer from HF. A portion of the propane layer is returned to fractionator 39 as a reflux by pump 76 and line 77 while the lower HF layer flows by valved line 78 to HF drum 68 and thence back to the reactor by line 69, pump 70 and line 71 as hereinbefore described. The uncondensed gases and excess propane from receiver 75 are conducted by line 79 to wash tower 80 for removal of HF as hereinafter described.

Any fixed gases produced in the process such as methane and ethane, together with a small amount of propane which separate in separator 48, are conducted by line 81 to tower 82 where they are cooled by a stream of reflux which serves to condense the major part of the HF vapor contained therein. The HF condensate together with some hydrocarbons is withdrawn by pump 83 and conducted by line 84 back to separator 48 or to the transfer line leading thereto.

From the top of gas separator 82 the gases flow by line 85 to cooler 86 and reflux drum 87 from which a liquid fraction comprised principally of HF and propane is returned to the tower by line 88 for reflux. The uncondensed gases pass from the top of receiver 87 thru line 89 and pressure-reducing valve 90 into wash tower 80.

A stream of water or other suitable absorbent for HF is introduced at the top of tower 80 by line 91 and flows from the bottom by line 92. Pump 93 serves to recirculate the water or other absorbent liquid back to the tower. From time to time or continuously excess wash solution may be withdrawn by valved line 94 and treated to recover dissolved HF which may be returned to the conversion system after dehydration. Washed hydrocarbon gases are withdrawn from the top of tower 80 by line 95 and may be discharged from the system by valved line 96 or given a further water-washing in wash tower 97 before discharging thru line 98.

The depropanized oil product containing tar, gasoline and unconverted hydrocarbons is withdrawn from the base of tower 39 by line 100 which conducts it to debutanizer tower 101 supplied by heat from trapout heater 102. Vapors from the top of tower 101 are withdrawn by line 103, condensed in condenser 104, and thence collected in reflux drum 105 from which pump-back is withdrawn by pump 106 to provide reflux for the tower by line 107. Uncondensed gases and excess butane pass from receiver 105 by line 108 to butane wash tower 109 where the butane is washed to remove any trace of HF remaining in it, water being supplied for this purpose by line 110. This water may have been previously employed in wash tower 97. It is recycled from wash tower 109 by pump 111 in valved line 112. As the concentration of HF in wash water in line 112 increases it is withdrawn continuously or intermittently by valved line 113 for use in wash tower 80 as hereinbefore described.

The debutanized stock in the base of tower 101 is conducted by line 114 to fractionator 36, preferably operated at atmospheric pressure, where a gasoline fraction is removed as a vapor by line 115 leading to heat exchanger 13 and condenser 116. The gasoline flows by line 117 to receiver 118 from which it is withdrawn by pump 119 and discharged from the system by valved line 120 leading thru cooler 121. Reflux for the tower 36 is withdrawn from line 120 by valved line 122.

If desired, a heavy oil fraction, for example gas oil, can be trapped out from tower 36 by valved line 123 and pump 124 which discharges it into feed line 37 for recycle to the conversion step of the process. The bottoms from fractionator 36 herein referred to as tar are withdrawn by line 125 leading to heat exchanger 15 and thence by pump 126 and line 127 thru cooler 128 where the temperature is dropped to about 150° F. Cooled tar is discharged from the system by line 129.

One of the advantageous features of my process of HF cracking is the recovery of HF in the anhydrous condition suitable for re-use in the process without expensive dehydration. All the HF removed from the product by distillation in tower 39 is condensed and recycled excepting that portion which is carried out of the liquid hydrocarbon gases collected in receiver 75. In removing the light fractions from the products in fractionator 39, a substantial amount of HF is conducted overhead with the hydrocarbon gases as an azeotrope. On condensation of the hydrocarbons, however, the major part of the HF therein separates as a liquid layer in the receiver 75 and is returned to the system by line 78 as previously indicated.

The combined treatment of tar and other liquid hydrocarbon products in fractionators 39, 101 and 36 offers the advantage of simplifying the recovery of HF therefrom by maintaining the tar in solution in the lighter hydrocarbon products, thus facilitating its handling and facilitating HF recovery from tar at lower temperatures owing to the effect of gasoline vapors in removing HF from the tar complex. On passing the products thru the depropanizer and the debutanizer, the substantially complete removal of HF is effected.

Having thus described my invention what I claim is:

The method of converting a hydrocarbon oil higher boiling than gasoline into products consisting chiefly of gasoline and tar, which method comprises intimately contacting said oil with a catalyst consisting of hydrogen fluoride at a temperature in the range of 200° to 400° F. with a catalyst to oil weight ratio in the range of .2:1 to 4:1, the low ratios in this range being employed with high temperatures in the temperature range and vice versa, at a pressure sufficient to maintain liquid phase conversion conditions and for a time of contact in the range of 1 to 60 minutes and sufficient to obtain substantial conversion of the oil into gasoline, gases and tar, introducing conversion products and catalyst into a settling zone maintained at high pressure, withdrawing gas from the upper part of the settling zone to a gas-liquid separation zone cooled at its upper end, returning separated liquid to said settling zone, withdrawing separated hydrogen fluoride-insoluble oil from the settling zone, reducing its pressure to that of a depropanizing zone and introducing it into said depropanizing zone, separately withdrawing a hydrogen fluoride-tar stream from the settling zone, reducing its pressure to about atmospheric to 20 pounds per square inch gauge, heating it and introducing it into a flash zone and flashing the bulk of the hydrogen fluoride therefrom in said flash zone, condensing the hydrogen fluoride removed by flashing in the flash zone and returning it to the contacting step, pumping the tar from the flash zone under increased pressure to the depropanizing zone, stripping residual hydrogen fluoride from the combined tar and hydrogen fluoride-insoluble oil in the depropanizing zone whereby the presence of light hydrogen fluoride-insoluble oil facilitates removal of substantially all hydrogen fluoride from the tar, withdrawing a liquid light hydrocarbon-hydrogen fluoride stream from an intermediate part of the depropanizing zone, separating hydrogen fluoride from the withdrawn stream and returning the separated hydrogen fluoride to the contacting step, cooling the stream of gases withdrawn from the upper part of the depropanizing zone and introducing the cooled stream into a receiving zone, combining gases from the receiving zone with gas from the gas-liquid separation zone, removing hydrogen fluoride from the combined gases, and fractionating the stripped mixture of tar and hydrogen fluoride-insoluble oil into a plurality of fractions including a gasoline fraction and a tar fraction.

ROBERT J. HENGSTEBECK.

REFERENCES CITED

The following references are of record in the file of this patent:

UNITED STATES PATENTS

| Number | Name | Date |
|---|---|---|
| 2,322,800 | Frey | June 29, 1943 |
| 2,372,338 | Penisten | Mar. 27, 1945 |
| 2,378,636 | Iverson | June 19, 1945 |
| 2,379,368 | Matuszak | June 26, 1945 |
| 2,388,156 | Kelley | Oct. 30, 1945 |
| 2,392,962 | Abrams et al. | Jan. 15, 1946 |
| 2,403,650 | Frey | July 9, 1946 |
| 2,405,993 | Burk | Aug. 20, 1946 |
| 2,417,875 | Leonard | Mar. 25, 1947 |
| 2,426,273 | Johnstone | Aug. 26, 1947 |
| 2,427,009 | Lien et al. | Sept. 9, 1947 |
| 2,434,040 | Hartman | Jan. 6, 1948 |
| 2,436,695 | Kuhn | Feb. 24, 1948 |

OTHER REFERENCES

Linn et al.: Ind. Eng Chem., vol. 37, No. 10, October 1945, pages 924–929.